W. R. BARGER.
WEANER.
APPLICATION FILED OCT. 18, 1920.
1,375,031.
Patented Apr. 19, 1921.
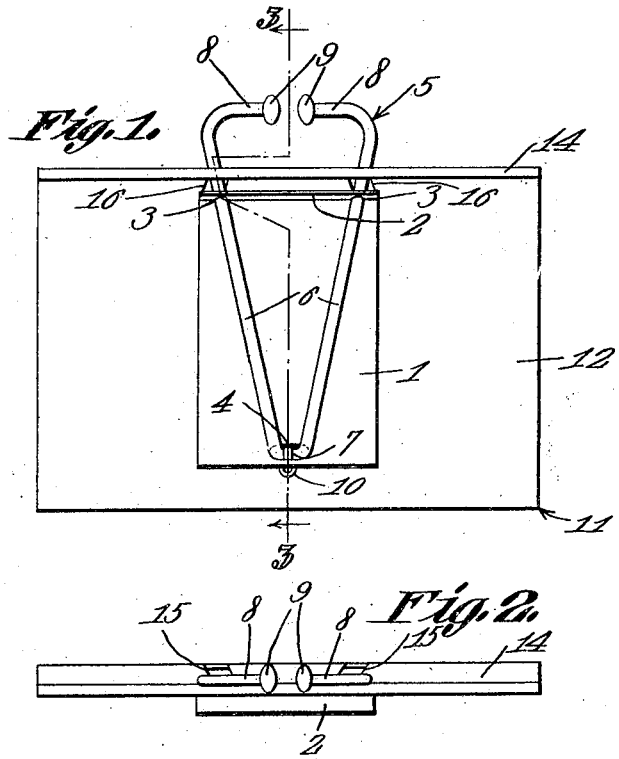
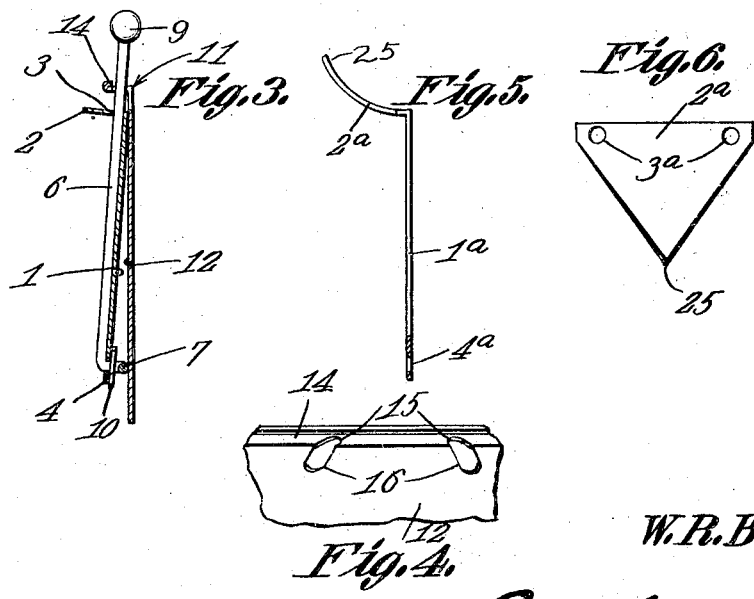
Inventor,
W. R. Barger
By C. A. Snow & Co.
Attorneys

UNITED STATES PATENT OFFICE.

WALTER R. BARGER, OF BENKELMAN, NEBRASKA.

WEANER.

1,375,031. Specification of Letters Patent. Patented Apr. 19, 1921.

Application filed October 18, 1920. Serial No. 417,701.

*To all whom it may concern:*

Be it known that I, WALTER R. BARGER, a citizen of the United States, residing at Benkelman, in the county of Dundy and State of Nebraska, have invented a new and useful Weaner, of which the following is a specification.

The device forming the subject matter of this application is a calf weaner of that general type shown in my prior Patent No. 1,338,606 granted on the 27th day of April, 1920, and the present application aims to provide novel means whereby the efficiency of the device will be enhanced, in that it will be practically impossible for a calf to suck, when the weaner is in operation.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in rear elevation, a device constructed in accordance with the invention; Fig. 2 is a top plan; Fig. 3 is a section on the line 3—3 of Fig. 1; Fig. 4 is a fragmental elevation showing a portion of the bib; Fig. 5 is an end elevation showing a modification in the body of the device; and Fig. 6 is a top plan of the element delineated in Fig. 5.

In carrying out the invention there is provided a body 1 preferably in the form of a metal plate, provided at its upper edge with a projecting flange 2 having spaced openings 3, there being an aperture 4 in the plate 1, near to the lower end thereof. The numeral 5 marks a resilient hanger including upwardly diverging arms 6 connected at their lower ends by an offset loop 7, the upper ends of the arms merging into upwardly extended fingers 8 terminating in bosses 9. The arms 6 extend along the body 1, the loop 7 being received in the aperture 4, and a retainer 10, such as a cotter pin, being inserted through the loop to hold the hanger 5 assembled with the body 1. The arms 6 are received slidably in the openings 3 of the flange 2, and extend above the flange.

In practical operation, the cotter pin 10 may be withdrawn from the loop 7, and the loop may be pushed backwardly out of the aperture 4. Then the hanger 5 may be moved upwardly, the arms 6 sliding in the openings 3. The nostril of the animal is received between the bosses 9. The hanger 5 is slid downwardly, the loop 7 is reinserted in the aperture 4, and the cotter pin 10 is mounted in place, the bosses 9 being held in gripping relation on the nostril of the calf.

Broadly considered, all of the foregoing construction is old, the same being shown in my prior Patent No. 1,336,606.

In carrying out the invention, there is provided a bib 11, comprising a main member 12 in the form of a plate, the main member 12 being of greater area than the body 1. The main member 12 is supplied at its upper edge with a projecting flange 14 overhanging the flange 2 of the body 1. Slots 15 are formed in the flange 14, the slots being extended, as shown at 16, into the main member 12, the slots diverging outwardly and downwardly. The upper portions of the arms 6 of the hanger 5 are received in the slots 16, loosely, and because the slots converge outwardly and downwardly, the bib 11 will have a free movement on the upwardly diverging arms 6 when the bib 12 is moved by contact with the nose of the animal, or by contact with the udder of the cow.

Theoretically, the body or plate 1 always hangs in a vertical position and is interposed between the nose of the calf and the udder of the cow. In practice, however, these conditions do not always obtain, since it is possible for the calf to raise its head and move its head laterally, thereby, sometimes, drawing the body 1 to one side, or permitting the calf to work laterally around the body, so as to gain access to the udder of the cow. In the present invention, the bib 11 is so constructed that it will move freely on the upper portions of the arms 6 of the hanger, and follow the nose of the calf. The bib 11 always remains in front of the nose of the calf and prevents the calf from sucking. The relatively free movement of the bib 11 on the upper portions of the arms 6 is promoted to no small extent, owing to the fact that the slots 15 of the bib diverge downwardly and outwardly.

In Figs. 5 and 6, parts hereinbefore described have been designated by numerals previously used with the suffix "a." The modification consists in providing the flange 2ª with a prominent prong or point 25, which, projecting forwardly, will engage the udder of the cow and promote the weaning operation should the calf be unusually obstinate.

Having thus described the invention, what is claimed is:—

1. A calf weaner including a body; a hanger mounted on the body and including upwardly diverging arms; and a bib comprising a main member of greater area than the body, the main member having a projecting top flange overhanging the body and provided with slots prolonged into the main member, the slots diverging downwardly and outwardly, the upper portions of the arms being received loosely in the slots.

2. A calf weaner including a body; a hanger mounted on the body and projecting upwardly above the body; and a bib of greater area than the body, the bib having a projecting top flange overhanging the body, the top flange being supplied with a slot wherein the upwardly projecting portion of the hanger is received loosely.

In testimony that I claim the foregoing as my own, I have hereto affixed my signature in the presence of two witnesses.

WALTER R. BARGER.

Witnesses:
I. R. WAKEFIELD,
J. W. WILLIAMS.